United States Patent [19]

Daniels

[11] Patent Number: 4,905,442
[45] Date of Patent: Mar. 6, 1990

[54] LATCHING JOINT COUPLING

[75] Inventor: Everett Daniels, Piedmont, S.C.

[73] Assignee: Wells Aluminum Corporation, South Bend, Ind.

[21] Appl. No.: 324,646

[22] Filed: Mar. 17, 1989

[51] Int. Cl.$^4$ .............................................. E04C 1/10
[52] U.S. Cl. ....................................... 52/588; 52/594; 52/731; 403/345
[58] Field of Search ................. 52/588, 731, 732, 594; 411/508, 904; 403/361, 345

[56] References Cited

U.S. PATENT DOCUMENTS

| | | |
|---|---|---|
| 2,430,200 | 11/1947 | Wilson . |
| 3,055,461 | 9/1962 | De Ridder . |
| 3,111,205 | 11/1963 | Greshan . |
| 3,411,261 | 11/1968 | Soddy . |
| 3,420,028 | 1/1969 | Barker .................................... 52/588 |
| 3,884,328 | 5/1975 | Williams ........................... 52/588 X |
| 4,106,254 | 8/1978 | Jack et al. . |
| 4,115,972 | 9/1978 | Varlonga ........................... 52/732 X |
| 4,332,119 | 6/1982 | Toews ................................ 52/588 X |

OTHER PUBLICATIONS

Reynolds Aluminum, "Reynolds Aluminum Colonial Columns", Jan. 1973.

Primary Examiner—Carl D. Friedman
Assistant Examiner—Lan Mai
Attorney, Agent, or Firm—Barnes & Thornburg

[57] ABSTRACT

A latch coupling includes a male and female member having complementary latching portions, all of which are dimensioned and positioned so as to assure that a first surface, which extends from the edge at which the two exterior surfaces are to meet, engage in their mating position before second surfaces which extend from the first surfaces during the insertion along the longitudinal axis of the male and female member. The complementary latching portions apply continuous mating forces to the first and second surfaces of the complementary shoulders when mated.

21 Claims, 4 Drawing Sheets

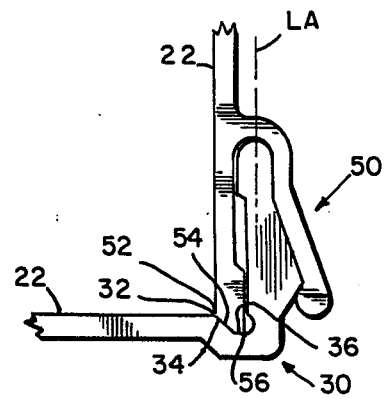
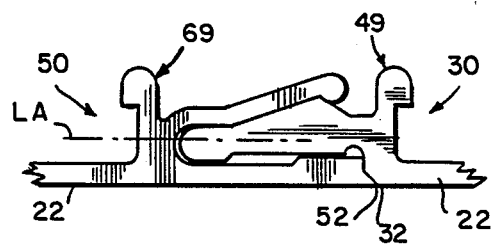
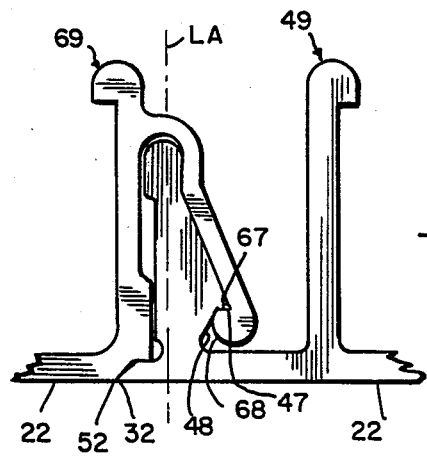
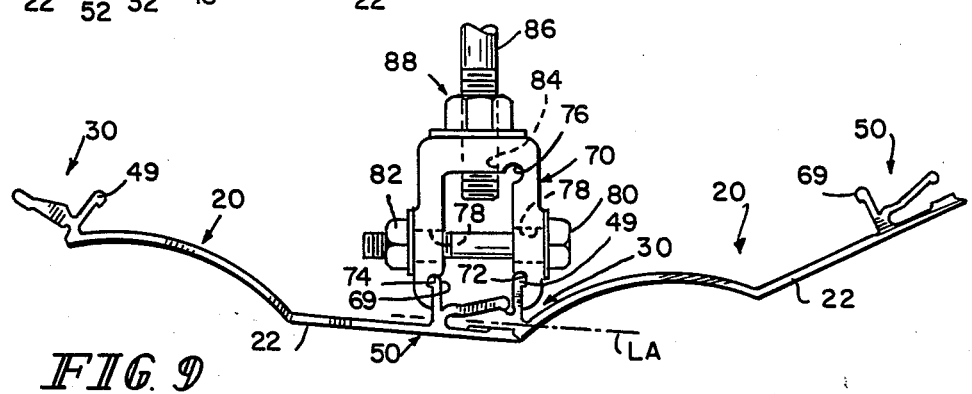

LATCHING JOINT COUPLING

BACKGROUND AND SUMMARY OF THE INVENTION

The present invention relates generally to a coupling for joining two external surfaces and more specifically to an improved latching coupling for two exterior surfaces.

In the building industry, the use of prefabricated elements to form walls, columns and other structural and non-structural members has steadily increased. In some situations, it is very desirable aesthetically to join prefabricated elements into a resulting unit with blind or hidden seams. This would give the impression that the prefabricated unit was not prefabricated and was formed as a single unitary or integral member.

One form of locking joint used in the prior art to interconnect a pair of prefabricated panels includes a tongue-in-groove, as illustrated in U.S. Pat. No. 2,430,200. Because the insertion is at an angle relative to the resulting longitudinal axis of the tongue-in-groove member, the elements must be rolled or rotated during insertion to form a flush or planar structure. This roll action produces an exposed seam at the junction. Also, there is no locking device to prevent the unrolling except possibly loading force in the installed condition. Without a locking device, the structure is not stable.

The use of locking devices integral with or separate from the interlocking members is illustrated in U.S. Pat. Nos. 3,111,205 and 3,411,261. These additionally are roll-type entries and therefore, have the same problem of exposing the mating seam. Similarly, the latches are designed to prevent unrolling only and are not designed to add structural stresses to provide a stable self supportive structure. In each of these patents a framing member is necessary about the interlocked elements.

The use of non-roll interlocking structural elements is illustrated in U.S. Pat. No. 3,055,461. Because the complementary male and female surfaces all meet simultaneously, any error in insertion or manufacturing tolerances prevents a resulting totally flat surface, as well as a totally blind or hidden seam. Spot welding or riveting is required to maintain the elements together.

Because the prior systems of interlocking panels or elements did not provide a rigid interlocking structure, the diameter of columns which were rigid or static was limited. The more parts needed, the stability and rigidity of the column decreased, and therefore required external clamping devices or rings. This made it difficult to assemble and work with at the construction site.

Thus, it is an object of the present invention to provide a new interlock joint coupling for interlocking elements which provides a blind seam.

Another object of the Present invention is to provide an interlocking joint coupling which is not process tolerance dependent in order to produce a blind seam.

A still even further object of the present invention is to provide an interlocking joint coupling wherein the latch is self-locking.

A still even further object of the present invention is to provide an interlocking joining coupling for elements or panels which sets up structural forces to assure the stability of the resulting product.

A still even further object of the present invention is to provide a interlocking coupling system for elements which interlock together to provide a free-standing stable column of any diameter.

These and other objects are attained by providing a coupling which has a male and female member having complementary latching portions, all of which are dimensioned and positioned so as to assure that a first surface, which extends from the edge at which the two exterior surfaces are to meet, engage in their mating position before second surfaces which extend from the first surfaces at an angle during the insertion along the longitudinal axis of the male and female member. The complementary latching portions apply continuous mating forces to the first and second surfaces, which form complementary shoulders, when mated. The length of the female member from its shoulder to a base of its recess is greater than the length of the male member from its shoulder to a distal end to prevent contact between the base and the distal end when mated. Also, the width of the male is smaller than a corresponding distance across the recess of the female member when mated to also allow proper mating of the male and female first and second surfaces.

The first surface of the male and female members extend at an angle less than 90° with respect to the longitudinal axis of the recess. The angle that the first surfaces make with the longitudinal axis of the recess are different such that the first surfaces diverge from the edge when mated. A portion of the male and female members which extend from the second surface extend from the second surface at an angle and immediately adjacent thereto are shaped so as not to engage prior to the complementary first and second surfaces during mating. The portions of the male and female member extending from the second surface do not engage when mated. The angle formed by the complementary shoulders permit the first surface to engage prior to the second surface during mating.

The latching portions are displaced from the longitudinal axis of the male and female members to allow insertion along the longitudinal axis. The recess of the female member is generally U-shaped with a first end extending from its shoulder and a second end on which the latching element of the female member is positioned. The female latching member includes a protuberance extending into the recess traverse to the recess longitudinal axis and rides along a camming surface of the male member and latches at a latch surface which is at a non-orthogonal angle with respect to longitudinal axis. This non-orthogonal latching surface of the male member allows the latch to provide the continuous mating forces to the first and second surface of the complementary shoulders when the male and female members are mated.

Other objects, advantages and novel features of the present invention will become apparent from the following detailed description of the invention when considered in conjunction with the accompanying drawings.

BRIEF DESCRIPTION OF THE DRAWINGS

FIG. 6 shows a mated coupling according to the principles of the present invention for an inside corner.

FIG. 7 shows a mated coupling according to the principles of the present invention wherein the modules are mated in a flat planar surface.

FIG. 8 is another embodiment of the coupling according to the principles of the present invention wherein the modular members are mated in a flat planar surface and also including a positive lock design.

FIG. 9 is a side view of two mated members which form a curved column incorporating the principles of the present invention.

DETAILED DESCRIPTION OF THE DRAWINGS

Figures 1, 2:
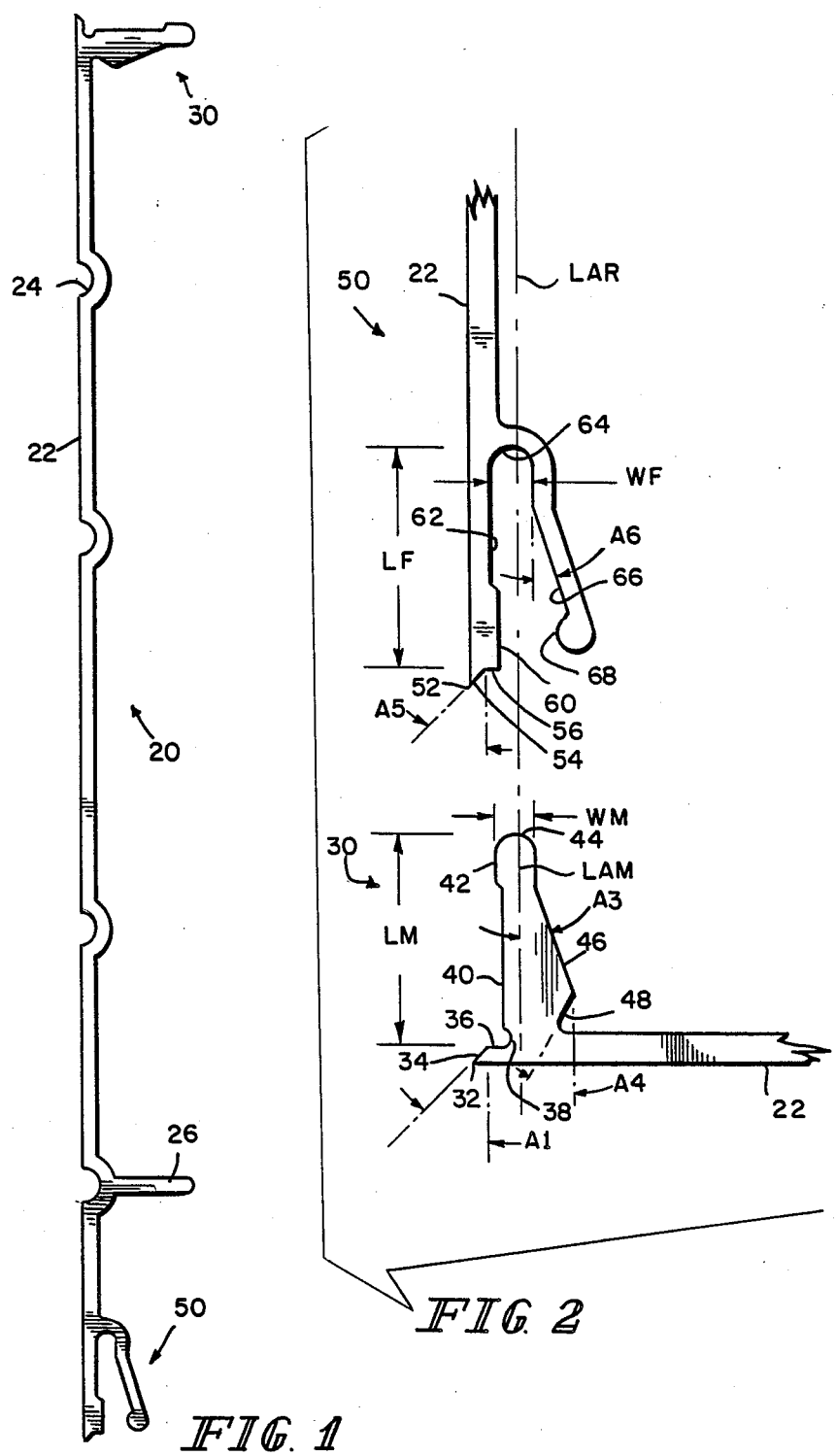
FIG. 1 is a side view of a single modular element with a pair of complementary couplings at each end thereof for rectangular outside corner according to the principles of the present invention.
FIGS. 2-5 illustrate a pair of couplings according to FIG. 1 at various stages of insertion or mating according to the principles of the present invention.

As shown in FIG. 1, a panel or modular element 20 to be constructed into a rectangular or square column or part of a wall includes male coupling member 30 and female coupling member 50 at opposite ends thereof to receive complementary male and female members to form an outside right angle extending from the exterior surface 22. Indentations 24 along the exterior surface 22 are for decoration and may also be used to strengthen the modular element 20. A rib 26 extends from the rear side of the modular element 20 and has the same height as the male member 30.

A pair of male and female members from adjacent modular elements to be joined are illustrated in FIG. 2. The male coupling 30 includes a first surface 34 extending from the edge 32 of the exterior surface 22 at an angle A1 with respect to the longitudinal male axis LAM. A second surface 36 extends from the first surface 34 to form a shoulder therebetween. A recess 38 extends from the second surface 36 and is connected and displaces from the surface 40 running along a major portion of the longitudinal axis of the male member LAM. The distal end 44 of the male coupling member is connected to the surface 40 by surface 42 which is displaced from the longitudinal male axis LAM. A camming surface 46 extends from the distal end of the male member at an angle A3 which diverges from the longitudinal axis of the male member LAM. A latching surface 48 extends from the camming surface 46 at an angle A4 with respect to the longitudinal male axis LAM. The distance between the second surface 36 and the distal end 44 of the male member is represented by the legend LM and the width of the distal end 44 of the male member is represented by the legend WM. The relationship of these different portions of the male coupling and their dimensions will be explained below with respect to the mating operation.

The female coupling 50 includes a first surface 54 extending from an edge 52 at an angle A5 and a second surface 56 extending from the first surface 54 and forming a shoulder therebetween. In the mated position, first and second surfaces 34 and 36 of the male member engage and mate with first and second surfaces 54 and 56 respectively of the female member such that the two edges 32 and 52 meet without separation to produce a blind seam. Surface 60 extends from the second surface 56 along the longitudinal axis of a recess LAR. Another surface 62 also extending along the longitudinal axis of the recess is displaced further from the surface 60 and terminates in the base 64 of the generally U-shaped recess. The other leg of the U-shape includes a portion 66 which extends at an angle A6 which diverges from the longitudinal axis of the recess LAR and terminates with a latching protrusion 68 which extends transverse to the leg portion 66 into the recess. The bend or angled surface 66 forms with the base of the recess 64 forms a living hinge and allows leg 66 and protruberance 68 to flex. The distance between the second surface 56 and the base 64 of the recess is noted as LF and the width of the recess at its base 64 is denoted by WF.

In the mated position, the surfaces 40 and 42 of the male member are adjacent surfaces 60 and 62 of the female member, the distal end 44 is adjacent the base 64 and the surface 66 is adjacent camming surface 46. The protruberance 68 of the female member engages the latching surface 48 of the male member. The selection of the various dimensions and the position of the elements of the male and female member will be discussed after describing the different stages of insertion illustrated in FIGS. 2-5.

For purposes of illustration, the angles A1 and A5 are 46° and 44° respectively, and should differ by at least 2°. The shallow angles A3 and A6 are to be in the range of 21° to 23°. The angle A4 of the latching surface may be in the range of 25° to 45°. The distances of separation LS and WS are in the range of 0.015 to 0.030 inches and 0.005 to 0.015 inches, respectively.

Figure 3:
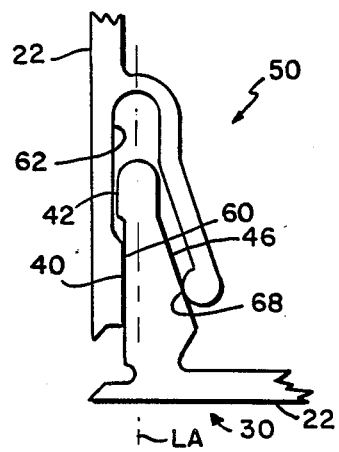

The coupling of adjacent panels progresses from FIG. 2 to FIG. 3 wherein the male coupling member 30 and female coupling member 50 are brought together along their longitudinal axes LA. The distal end 42 of the male member progresses along the recess of the female member. Surfaces 40 and 42 of the male moves along surfaces 60 and 62 of the recess respectively. The protruberance 68 of the latch of the female member rides along camming surface 46. The angle A6 that the camming surface 46 makes with the longitudinal axis LA is a very shallow angle to allow easy insertion. The point of engagement of surfaces 40, 42 and 46 of the male member with surfaces and elements 60, 62 and 68 respectively of the female member is illustrated in FIG. 3.

Figure 4:
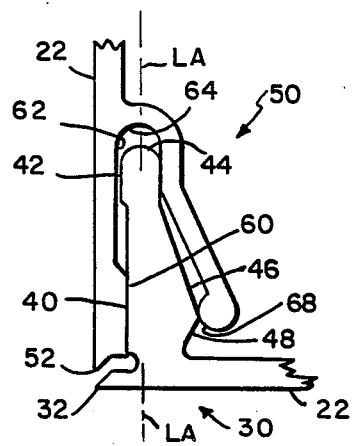

With continued insertion of the male member into the female member, the distal end 44 enters the narrow U-shaped section of the recess. Since the width WM of the distal end 44 is smaller than the opening of the recess adjacent the base 64, the distal end is allowed limited movement transverse the longitudinal axis LA and thus may intersect either leg of the U-shaped recess adjacent the base 64. As illustrated in FIG. 4, the distal end may ride off surface 62 of the recess and intersect the opposite surface of the recess. The protruberance 68 has reached the end of camming surface 46 and provides a maximum force between surfaces 40 and 60 of the male and female elements respectively.

The ultimate objective is that edges 32 and 52 of the male and female member, respectively, always meet and superimpose so as to form a blind or hidden seam without a gap therebetween. In order to achieve this objective, it is critical that none of the surfaces intersecting during the mating operation, with insertion of the male into the female member, or the latching, prevents this coincident of edges 32 and 52. One way of achieving this objective is the longitudinal insertion of the male into the female member instead of using the roll mating of the prior art.

Additionally, to achieve this objective, the first surfaces 34 and 54 of the male and female member meet first with sufficient spacing of the remaining surfaces to guide the edges 32 and 52 into absolute coincidence. The angle A1 that the first surface 34 of the male member makes with the longitudinal axis LA is greater than the angle A5 that the first surface 54 of the female member makes with the longitudinal axis LA. Thus, when the longitudinal axis LAM of the male member and the longitudinal axis LAR of the female member are made parallel, the leading edge 52 of the female member will intersect the first surface 34 of the male member because the male member has a greater angle.

Figure 5:
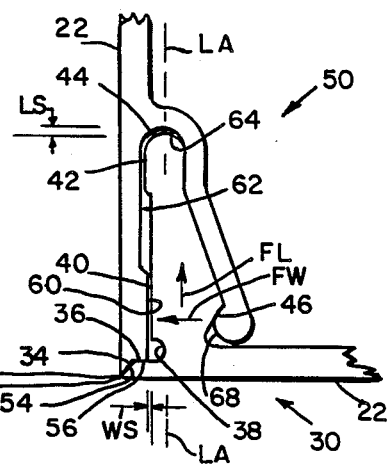

With continued insertion along the longitudinal axis LA, the male member will move laterally separating surfaces 40 and 60 of the male and female members respectively until the second surfaces 36 and 56 of the male and female members intersect, as illustrated in FIG. 5. The separation of surfaces 40 and 60 is illustrated in FIG. 5 as the width separation WS and the separation of the distal end 44 of the male member from the base of the recess 64 of the female member is illustrated as longitudinal separation or the length separation LS. It should also be noted that the shoulder or the intersection of the first and second surfaces of the male and female members are not coincidence. Thus, the separation of the different surface and elements other than the mating edges 32 and 52 allow for their alignment and engagement without interference of the other surfaces or elements of the coupling and latch. The recess 38 on the male member also prevents the intersection of the second surface 56 and adjacent portions of surface 60 from the female member from contacting a portion of the male member to prevent the desired coincidence of edges 32 and 52.

During the process of insertion from FIG. 4 to FIG. 5, the protrusion 68 of the latch begins to ride down onto latching surface 48. Because surface 48 is at an angle with respect to the longitudinal axis LA, the interaction of the protrusion 68 and the latching surface 48 produces a force FL along the length or longitudinal axis and a force FW transverse thereto or along the width. The proportionality of the forces is related to the angle of the surface 48 to the longitudinal axis LA. This force vector is transferred to the first and second surfaces 34, 36 and 54, 56 of the male and female members, respectively, to provide a continuous mating force. Thus, the action of the protrusion 68 on the latching surface 48 not only produces a closing action for the surfaces during the insertion or mating process, but maintains the mated elements under continuous forces. These forces at first and second mating surfaces add rigidity to the ultimate structure. The angles of the second surfaces 36, 56 make with the longitudinal axis act as the only stop along the longitudinal axis.

Although FIGS. 1-5 have shown a latch coupling for an outside corner, the application of the present latch coupling to an inside corner is illustrated in FIG. 6. The exterior surfaces 22 are shown meeting at an interior corner. The second surfaces 36 and 56 of the male and female members respectively are still generally perpendicular to the longitudinal axis which is still the insertion axis and the first surfaces 34 and 54 are at an angle with respect to the longitudinal axis such that the edges 32 and 52 meet coincidentally.

In addition to right angle junctions of the surfaces 22 of two modular elements, the present invention is also applicable to flat or planar surfaces as illustrated in FIGS. 7 and 8. The edges 32 and 52 meet coincidentally on the exterior surface with the male member 30 inserted in the female member 50 of an adjacent panel. Also shown in FIG. 7 are assembly legs, 49 on the male member and 69 on the female member. These assembly legs are used with a tool, for example pliers or any other tool, to apply force along the longitudinal axis to aid the necessary mating. This offers an alternative to the assembler than to use a tool on the outer edges 52 and 32 which would be detrimental to these edges when they are used to mate in a hidden or blind seam.

In FIGS. 1-7, the protruberance 68 has been shown as a continuous curve surface which rides onto and latches or locks with the latching surface 48 of the male element. This produces a disassemblable latch wherein a force along the longitudinal axis would cause the curved surface of the protruberance 68 to ride up locking surface 48 and release the latched members. It should be noted that the members are designed such that the separation force needed to disassemble or unlatch the male and female members is greater than that expected in the environment in which the modular elements are to be used.

To provide a positive lock which requires something in addition to a force along the longitudinal axis to disengage the protruberance 68 from the locking surface 48, as illustrated in FIG. 8, the continuous curved surface of the protruberance 68 has been modified to provide a flat surface 67 perpendicular to the longitudinal axis LA. Similarly, the latching surface 48 has also bee modified to include a flat surface 47 also perpendicular to the longitudinal axis LA. To disengage the locking of the surfaces 47 and 67 would require a force parallel to the surfaces or perpendicular to the longitudinal axis LA. Thus, forces which occur in the environment, as well as extraordinary forces experience in the environment, would not unlatch the surfaces 47 and 67.

Although FIG. 7 shows the longitudinal axis LA of the male and female members being parallel to the external surface 22 of a pair of modular elements lying in a single plane, the longitudinal axis LA may be at an angle with respect to the parallel surfaces 22, as illustrated in FIG. 8. Although the longitudinal axis and the insertion axis LA are perpendicular to the exterior surfaces 22 in FIG. 8, the assembly legs 49 and 69 are still perpendicular to the external surfaces 22. Thus, in FIG. 8 they are not used to apply force during the mating or assembly process. The assembly legs 49 and 69 in FIGS. 7 and 8 have a second purpose besides adding forces during the mating of the male and female members. A clamP may be applied across assembly legs 49 and 69 to provide additional forces.

As illustrated in FIG. 9, a clamp 70, being generally U-shaped, includes recesses 72 and 74 to engage and lock with the assembly legs 49 and 69 of a mated male and female elements. A recess or thinned area 76 allows flexing of the legs of the U-shaped clamp and allows the ends of the U-shape to ride over the assembling legs 49 and 69 and snap into place. Apertures 78 are aligned in opposing legs of the U-shaped clamp to receive a fastener bolt 80. A nut 82 is provided on the bolt 80 to provide force to close the U-shape at its ends. In some applications, it is important that the modular elements 22 be further secured either to each other or to an external structure. In such a case a tie bar 86 is received in threaded aPerture 84 at the base or bite of the U-shaped clamp 70. A lock nut 84 locks the tie rod 86. In a column structure, the tie bar 86 would connect opposed coupling elements.

Also illustrated in FIG. 9 are a pair of modular elements 22 mated together to form a portion of a curved surface. The angles of the first and second surfaces of the male and female members are selected to provide a curved surface even though they bear the same general relationship to the longitudinal axis LA of the male and female members as in the other Figures.

Figure 10:
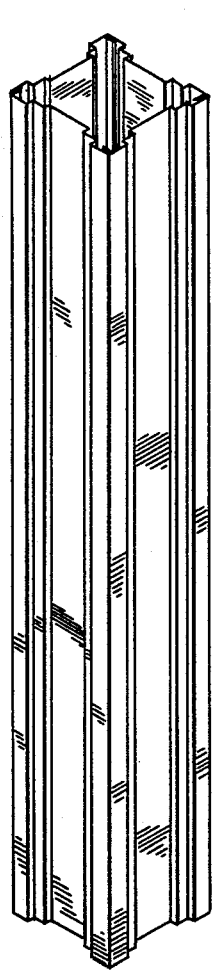
FIG. 10 is a perspective view of a square column using the coupling of the present invention.

A plurality of the structures of FIGS. 1–5 may be assembled to provide a rectangular or square column as illustrated in FIG. 10. The structure of FIG. 10 could include four modular elements joinable at any vertical edge, for example, at the four corners or at one of the indentures. Also it may include more than four, for example eight, modular members, namely four corner elements and four face panels. In this embodiment where the face panels are joined to the corner elements, an inside latch coupling as shown in FIG. 6 would be used.

Figure 11:
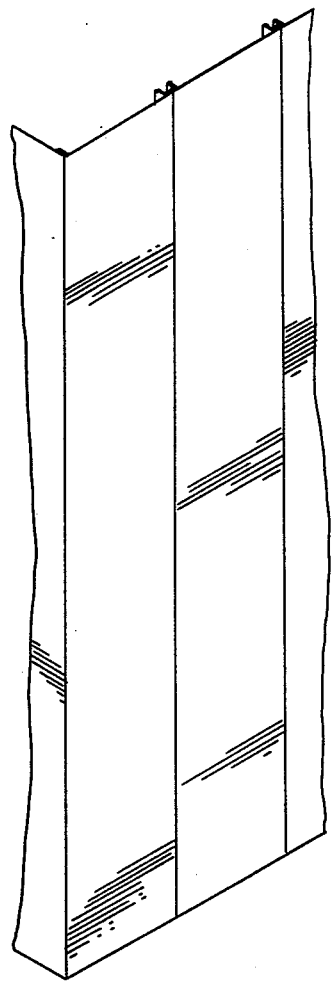
FIG. 11 is a perspective view of a wall assembled using the coupling of FIGS. 2 and 7 or 8.

The use of latch coupling of FIGS. 7 and 8 to form a continuous wall is illustrated in FIG. 11. Also, a corner may use the latch of FIGS. 1–5.

Figure 12:
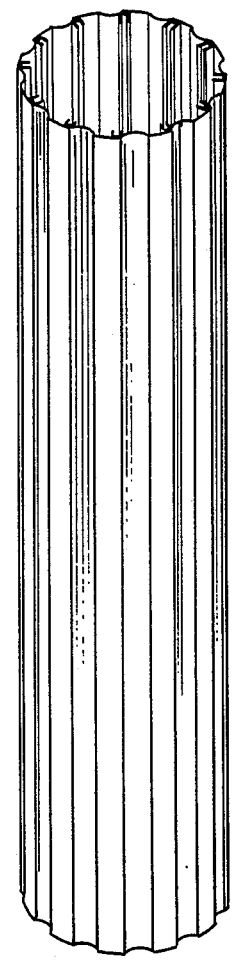
FIG. 12 is a perspective view of a curved column using the coupling of FIG. 9.

A fluted or round column using the modular element of FIG. 9 would produce the column of FIG. 12.

Although the present invention has been described and illustrated in detail, it is to be clearly understood that the same is by way of illustration and example onlY, and is not to be taken by way of limitation. The spirit and scope of the present invention are to be limited only by the terms of the appended claims.

What is claimed:

1. A coupling for joining exterior surfaces of two structural element along a substantially blind seam line comprising:
    a male means and a female means on an interior surface adjacent a respective edge which are to meet along said line when mated;
    complementary shoulders on said male and female means, each shoulder having a first surface extending from and intersecting a respective edge and a second surface extending from said first surface;
    said female means including a recess extending from its shoulder and having a longitudinal axis and said male means includes a male portion extending from its shoulder and having a longitudinal axis which is parallel to said recesses' longitudinal axis when mating;
    complementary latching means on said male and female means for latching said male and female means together when mated; and
    said male and female means and said latching means being dimensioned and positioned to assure that said first surfaces engage in their mating position before said second surfaces during insertion along said longitudinal axis.

2. A coupling according to claim 1, wherein a length from said female means' second surface to a base of said recess is greater than a length from said male means' second surface to a distal end of said male portion to prevent contact between said base and distal end when mated.

3. A coupling according to claim 1, wherein the width of said male portion is smaller than a corresponding distance across said recess when mated.

4. A coupling according to claim 1, wherein said first surface of said female means extends from said edge at an angle of less than 90° with respect to said longitudinal axis of said recess.

5. A coupling according to claim 4, wherein said second surface on said female means extends from said first surface at an angle of 90° with respect to said longitudinal axis of said recess.

6. A coupling according to claim 1, wherein said first surface of said female means extends from said edge at an angle of less than 45° with respect to said longitudinal axis of said recess.

7. A coupling according to claim 1, wherein said first surface of said male and female means extends from their edge at different angles with respect to said longitudinal axis of said recess such that said first surface diverges from said edge when mated.

8. A coupling according to claim 1, wherein said latching means is displaced from the longitudinal axis of said male and female means to allow insertion along said longitudinal axes.

9. A coupling according to claim 1, wherein portions of said male and female means, extending from said second surfaces at an angle and immediately adjacent thereto, are shaped not to engage during and after said first and second surfaces engage, during and after mating.

10. A coupling according to claim 1, wherein the angle formed by said complementary shoulders permits the first surfaces to engage prior to said second surface engaging during mating.

11. A coupling for joining exterior surfaces of two structural elements along a substantially blind seam line comprising:
    a male means and a female means on a interior surface adjacent a respective edge which are to meet along said line when mated;
    complementary shoulders on said male and female means, each shoulder having a first surface extending from and intersecting a respective edge and a second surface extending from said first surface;
    said female means including a recess extending from its shoulder and having a longitudinal axis and said male means includes a male portion extending from its shoulder and having a longitudinal axis which is parallel to said recesses' longitudinal axis when mating; and
    complementary latching means on said male and female means for latching said male and female means together and applying continuous mating forces to said first and second surfaces of said complementary shoulders when mated after insertion along said longitudinal axis.

12. A coupling according to claim 11, wherein portions of said male and female means extending from said second surfaces at an angle and immediately adjacent thereto, are shaped not to engage when mated to permit said latch means to continuously apply said mating force to said first and second surfaces.

13. A coupling according to claim 11, wherein said recess is generally U-shaped with a first end extending from its shoulder and a second end, and said latching means on said female means includes a pertruberance extending into said recess transverse to said recesses' longitudinal axis at said second end of said recess.

14. A coupling according to claim 13, wherein said latching means on said male means includes a latching surface at a nonorthogonal angle with respect to its longitudinal axis for creating said mating forces when mated with said pertruberance.

15. A coupling according to claim 14, wherein said latching surface is at an angle in the range of 25° to 45° with respect to said longitudinal axis.

16. A coupling according to claim 13, wherein a portion of said U adjacent said second end extends at a divergent angle from a portion parallel to said longitudinal axis.

17. A coupling according to claim 16, wherein said male means includes a camming surface at a divergent angle with respect to its distal end which is adjacent said divergent angle portion of said second end of said U when mated axis and said pertruberance engages said camming surface during inserting of said male means into said female means.

18. A coupling according to claim 11, wherein said latching means on said male means includes a latching surface at a nonorthogonal angle with respect to its longitudinal axis for creating said mating forces when mated with said latching means on said female means.

19. A coupling according to claim 18, wherein said latching surface is at an angle in the range of 25° to 45° with respect to said longitudinal axis.

20. A coupling according to claim 11, wherein a length from said female means' second surface to a base of said recess is greater than a length from said male means' second surface to a distal end of said male portion to prevent contact between said base and distal end when mated.

21. A coupling according to claim 20, wherein the width of said male portion is smaller than a corresponding distance across said recess when mated.

* * * * *